(12) United States Patent
You et al.

(10) Patent No.: US 9,537,981 B2
(45) Date of Patent: Jan. 3, 2017

(54) METHOD AND APPARATUS FOR TRANSMITTING CHANNEL PARAMETER INFORMATION

(71) Applicant: LG ELECTRONICS INC., Seoul (KR)

(72) Inventors: Hyang Sun You, Anyang-si (KR); Jong Hyun Park, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/359,755

(22) PCT Filed: Dec. 5, 2012

(86) PCT No.: PCT/KR2012/010464
§ 371 (c)(1),
(2) Date: May 21, 2014

(87) PCT Pub. No.: WO2013/085270
PCT Pub. Date: Jun. 13, 2013

(65) Prior Publication Data
US 2014/0294020 A1     Oct. 2, 2014

Related U.S. Application Data

(60) Provisional application No. 61/567,072, filed on Dec. 5, 2011.

(51) Int. Cl.
*H04L 29/06*     (2006.01)
*H04L 27/26*     (2006.01)
(Continued)

(52) U.S. Cl.
CPC ........... *H04L 69/22* (2013.01); *H04L 25/0226* (2013.01); *H04L 25/0228* (2013.01); *H04L 27/2613* (2013.01); *H04L 5/0048* (2013.01)

(58) Field of Classification Search
None
See application file for complete search history.

(56) References Cited

U.S. PATENT DOCUMENTS

2005/0180353 A1* 8/2005 Hansen ................ H04L 1/0001
370/328
2012/0269142 A1* 10/2012 Porat ................. H04W 72/1231
370/329

FOREIGN PATENT DOCUMENTS

KR     10-2011-0036485     4/2011
KR     10-2011-0044307     4/2011
(Continued)

OTHER PUBLICATIONS

Vermani, et al., "Preamble Format for 1 MHz," doc.: IEEE 802.11-11/1482r2, Nov. 2011, 30 pages.
(Continued)

*Primary Examiner* — Kouroush Mohebbi
(74) *Attorney, Agent, or Firm* — Lee Hong Degerman Kang & Waimey

(57) ABSTRACT

The present invention relates to a method and apparatus for transmitting channel parameter information. A method for transmitting a frame in consideration of a channel environment includes the steps of: receiving long training field (LTF) setting information from a station; creating a frame including an LTF, a plurality of divided data fields, and an additional LTF on the basis of the LTF setting information; and transmitting the frame, wherein the LTF positions are ahead of the plurality of divided data fields, the additional LTF positions are between or behind the plurality of divided data fields, and the LTF setting information can be created
(Continued)

(A)

(B)

on the basis of the movement of the station. Therefore, channel estimation performance can be increased.

6 Claims, 17 Drawing Sheets

(51) Int. Cl.
   *H04L 25/02* (2006.01)
   *H04L 5/00* (2006.01)

(56) References Cited

FOREIGN PATENT DOCUMENTS

| KR | 10-2011-0093559 | 8/2011 |
| KR | 10-2011-0114518 | 10/2011 |

OTHER PUBLICATIONS

Korean Intellectual Property Office Application Serial No. 10-2014-7018188, Office Action dated Apr. 29, 2015, 4 pages.
PCT International Application No. PCT/KR2012/010464, Written Opinion of the International Searching Authority dated Mar. 11, 2013, 1 page.

* cited by examiner (A)

(B)

(A)

(B)

LTF Location element format (A)

(B)

(A)

(B)

(C)

(A)

(B)

(C)

(A)

(B)

METHOD AND APPARATUS FOR TRANSMITTING CHANNEL PARAMETER INFORMATION

CROSS-REFERENCE TO RELATED APPLICATIONS

This application is the National Stage filing under 35 U.S.C. 371 of International Application No. PCT/KR2012/010464, filed on Dec. 5, 2012, which claims the benefit of U.S. Provisional Application Ser. No. 61/567,072, filed on Dec. 5, 2011, the contents of which are all hereby incorporated by reference herein in their entirety.

BACKGROUND OF THE INVENTION

Field of the Invention

The present invention concerns wireless communications, and more specifically, to a method and apparatus of transmitting channel change information.

Related Art

Machine-to-machine (M2M) systems recently draw attention as next-generation communication technology and new standards for supporting the same are now being establishment in IEEE 802.11 WLAN. An M2M system means a network where not humans but machines perform communication to exchange information. Temperature sensors, moisture sensors, cameras, TVs or other home appliances, factory processing machines, vehicles, and other large-size machines may be M2M elements. Recently, as smart grid, e-Health, ubiquitous and other various communication services appear, M2M techniques are being utilized to support such services. The M2M system has the following features.

1) Many stations: M2M assumes a great number of stations unlike existing networks because not only an individual's machine but also sensors installed in home or business should be taken into account. Accordingly, a large number of stations may be linked to a single AP.

2) Low traffic load per station: since an M2M terminal collects and reports ambient information in its traffic pattern, it need not often send information and the amount of information to be sent is relatively small.

3) Uplink-centered: M2M has a structure of primarily receiving commands on downlink, taking an action, and then reporting resultant data on uplink. Major data is usually transmitted on uplink, and thus, M2M is uplink-centered.

4) Long life-span station: an M2M terminal is primarily battery-powered, and is in many cases difficult for a user to recharge often. Accordingly, battery consumption needs to be minimized, ensuring long lifespan.

5) Automatic restoring function: an M2M terminal is hard for a human to directly manipulate and thus it requires a self-restoring function,

SUMMARY OF THE INVENTION

An object of the present invention is to provide a method of transmitting a training field.

Another object of the present invention is to provide an apparatus of performing a method of transmitting a training field.

To achieve the above-described objects of the present invention, according to an aspect of the present invention, a method of transmitting a frame in consideration of a channel environment comprises receiving an LTF (long training field) configuration information from a station, generating a frame including an LTF, a plurality of split data fields, and an additional LTF based on the LTF configuration information, transmitting the frame, in which the LTF may be positioned ahead of the plurality of split data fields, and the additional LTF may be positioned between the plurality of split data fields or behind the plurality of split data fields, and in which the LTF configuration information may be information generated based on a move of the station. The LTF configuration information may be at least one information of information on a travelling velocity of the station, Doppler frequency information due to the move of the station, and location information of the additional LTF determined based on the move of the station. The method may further comprise receiving guard interval determining information for determining a guard interval to be used upon transmission of the frame, and adding the guard interval to the frame based on the guard interval determining information. The guard interval determining information may be at least one information of maximum channel delay information and RMS (root mean square) channel delay information. The LTF configuration information and the guard interval determining information are included in one frame and are generated. The information for determining a method of transmitting the additional LTF may be generated only when MCS (modulation and coding scheme) index information used for generating a frame has an index not more than a predetermined MCS index.

To achieve the above-described objects of the present invention, according to an aspect of the present invention, a first station transmitting a frame in consideration of a channel environment comprises a processor and a transceiver, in which the processor may be configured to receive LTF (long training field) configuration information from a second station and to generate a frame including an LTF, a plurality of split data fields, and an additional LTF based on the LTF configuration information, in which the transmitter may be configured to transmit the frame, in which the LTF may be positioned ahead of the plurality of split data fields and the additional LTF may be positioned between the plurality of split data fields or behind the plurality of split data fields, and in which the LTF configuration information may be generated based on a move of the second station. The LTF configuration information may be at least one information of information on a travelling velocity of the station, Doppler frequency information due to the move of the station, and location information of the additional LTF determined based on the move of the station. The processor may be configured to receive guard interval determining information for determining a guard interval to be used upon transmission of the frame and to add the guard interval to the frame based on the guard interval determining information. The guard interval determining information may be at least one information of maximum channel delay information and RMS (root mean square) channel delay information. The LTF configuration information and the guard interval determining information are included in one frame and are generated. The information for determining a method of transmitting the additional LTF may be generated only when MCS (modulation and coding scheme) index information used for generating a frame has an index not more than a predetermined MCS index.

As described above, in a method and apparatus of transmitting a training field according to an embodiment of the present invention, a data field in a frame is split into a plurality of subfields that may be then demodulated using a training field that is additionally transmitted. Accordingly, in case a channel circumstance varies, exact channel estimation is possible based on the added training field, thus demodulating the split data field. Accordingly, channel estimation performance on the data field may be enhanced.

DESCRIPTION OF EXEMPLARY EMBODIMENTS

Figure 1:
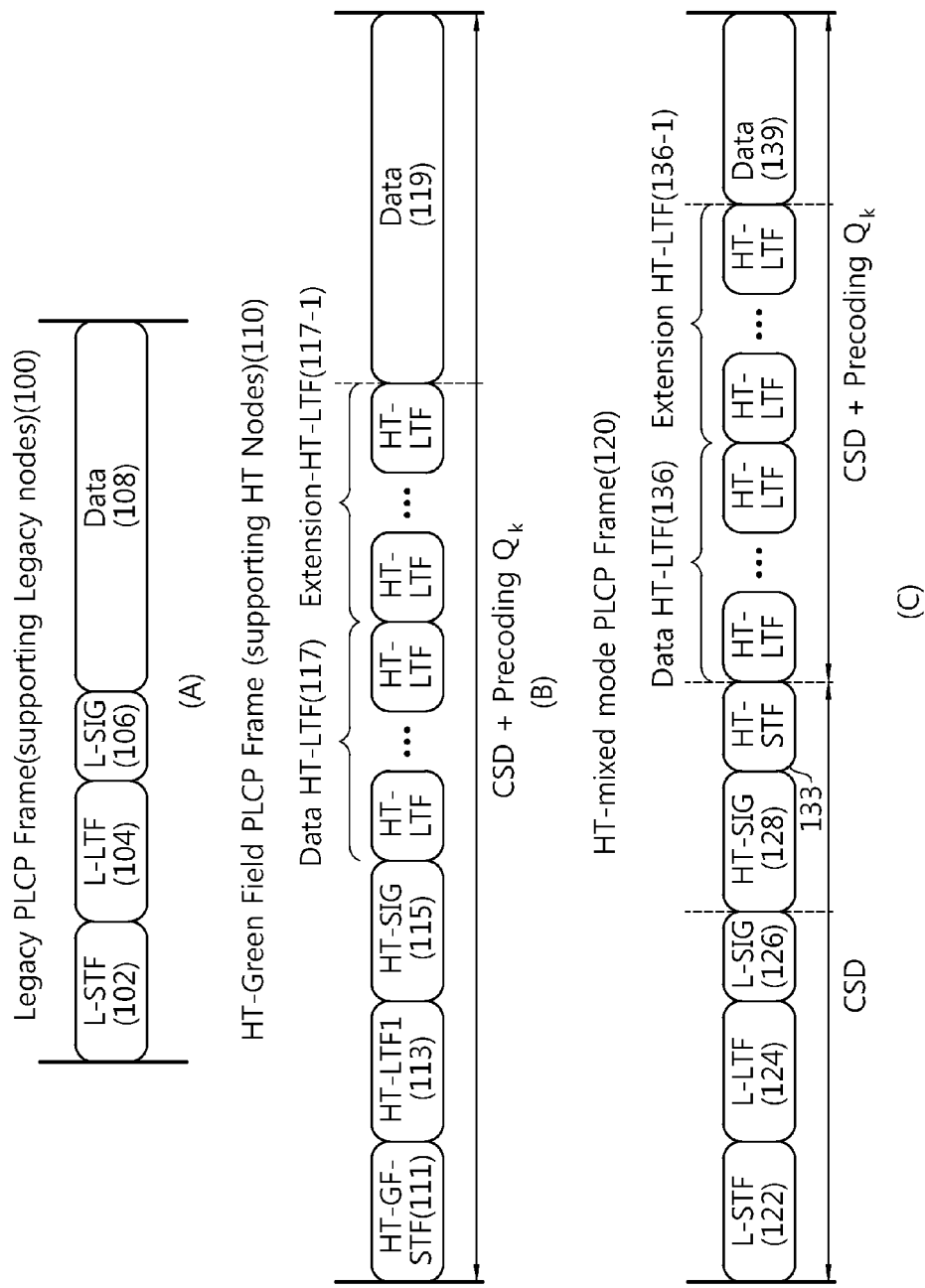
FIG. 1 illustrates frame formats of a physical layer convergence procedure protocol data unit (PPDU) defined in the existing IEEE 802.11 standard.

FIG. 1 illustrates frame formats of a physical layer convergence procedure protocol data unit (PPDU) defined in the existing IEEE 802.11 standard.

FIG. 1(A) is a concept view illustrating a legacy PLCP frame used in IEEE 802.11a, IEEE 802.11b, and IEEE 802.11g.

Referring to FIG. 1(A), the legacy PLCP frame (100) includes a legacy short training field (L-STF) 102, a legacy long training field (L-LTF) 104, a legacy signal (L-SIG) 106, and a Data 108.

The L-STF 102 is used for frame timing acquisition and automatic gain control convergence, and the L-LTF 104 is used for channel estimation in order to demodulate the L-SIG 106 and Data 108. The L-SIG 106 contains information for demodulating and decoding the Data 108 to be subsequently transmitted.

A subsequent standard, IEEE 802.11n high throughput system (hereinafter, HT system), has been designed to support the legacy PLCP format used in IEEE 802.11a, 802.11b, and 802.11g. IEEE 802.11n defines the frame format that may be used in a system where only HT STA (high throughput stations) exist separately from the frame format that may be used when legacy STAs used in existing IEEE 802.11a, 802.11b, and 802.11g and HT STAs newly defined in 802.11n co-exist.

FIG. 1(B) is a concept view illustrating an HT-green field PLCP frame 110.

Referring to FIG. 1(B), IEEE 802.11n defines a system consisting only of HT STAs and newly defines a PLCP frame format that may be efficiently used in the system consisting only of HT STAs. Such PLCP frame format is defined as HT-green field PLCP format 110.

The HT-green field PLCP format 110 includes an HT-green field short training field (HT-GF STF) 111, an HT long training field (HT-LTF) 113, an HT signal (HT-SIG) 115, additional HT-LTFs 117 and 117-1, and a Data 119. The HT-GF-STF 111 is used for frame timing acquisition and automatic gain control convergence. The HT-LTF 113 is used for performing channel estimation in order to demodulate the HT-SIG 115 and Data 119. The HT-SIG 115 contains information for demodulating and decoding the Data to be subsequently transmitted. The additional HT-LTFs 117 and 117-1 may be added to the frame format in case MIMO (multiple input multiple output) is used. In case MIMO is used for a plurality of STAs, the additional HT-LTFs 117 and 117-1 may contain channel estimation information for each STA.

FIG. 1(C) is a concept view illustrating an HT-mixed mode PLCP frame 120.

Referring to FIG. 1(C), IEEE 802.11n supports a PLCP frame designed to support HT (high throughput) mode in a system where legacy STAs and HT STAs co-exist. Such frame format is denoted HT-mixed mode PLCP frame 120. In the HT-mixed mode PLCP frame 120, an L-STF 122, an L-LTF 124, and an L-SIG 126 are first transmitted in order to frame format that may also be understood by the legacy STAs. Thereafter, an HT signal (HT-SIG) 128 is transmitted that transmits information necessary for demodulating and decoding data to be transmitted for HT. The HT-SIG 128 and its preceding fields are transmitted in a non-beamforming manner so that various STAs including legacy STAs may receive information. The HT-LTF 136 and data 139 that are supposed to be sent after the HT-SIG 128 are subjected to signal transmission through precoding. At this time, in order for an STA performing precoding to receive data frames to consider a portion where power is varied by precoding, the HT short training field (HT-STF) 133 is transmitted and the HT-LTF 136 and data 139 are then transmitted.

Figure 2:
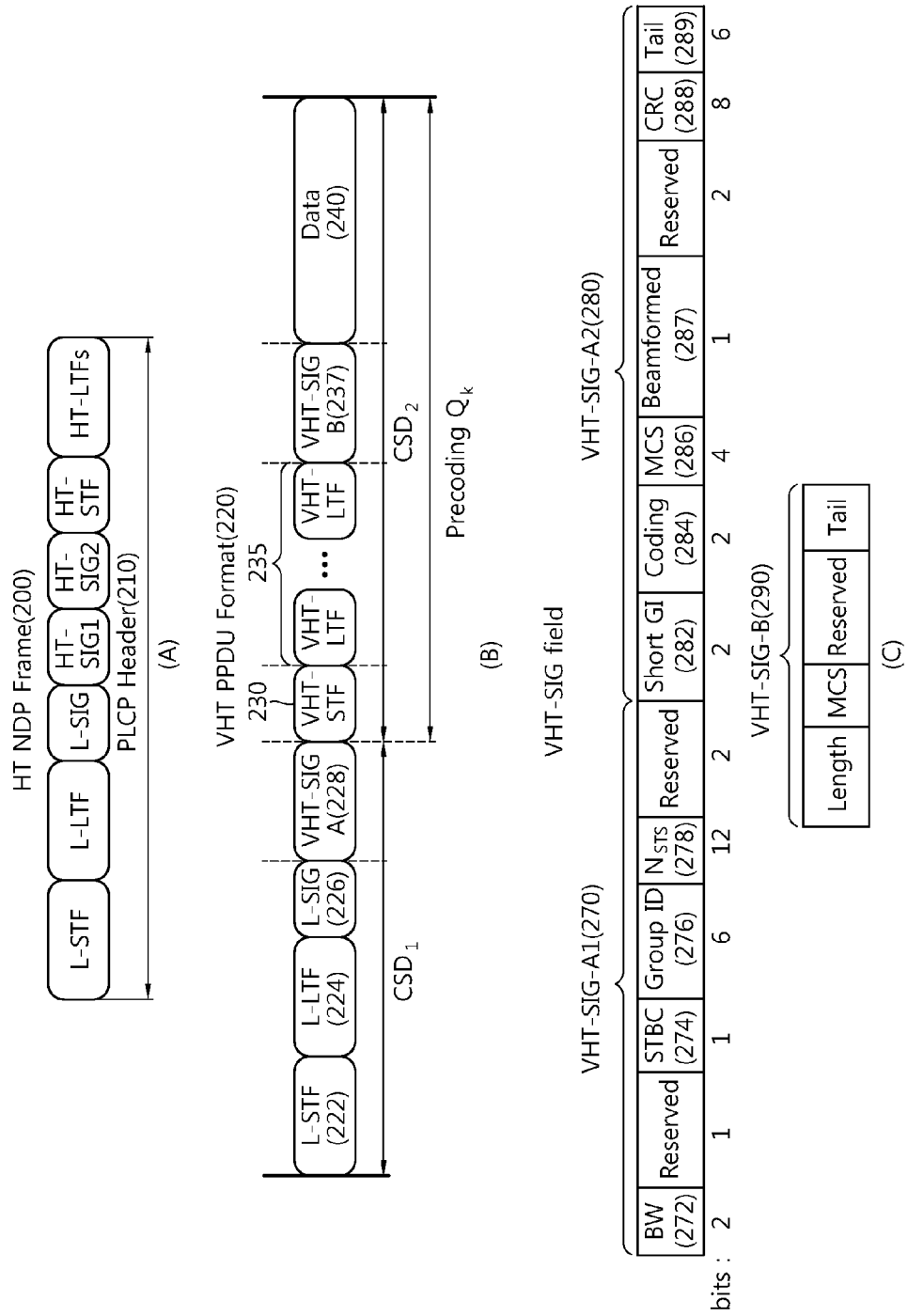
FIG. 2 illustrates frame formats of a physical layer convergence procedure protocol data unit (PPDU) defined in the existing IEEE 802.11 standard.

FIG. 2 illustrates frame formats of a physical layer convergence procedure protocol data unit (PPDU) defined in the existing IEEE 802.11 standard.

FIG. 2(A) is a concept view illustrating an HT NDP frame 200.

Referring to FIG. 2(A), a major feature of an HT system is to be able to enhance system throughput by sending several spatial streams using multiple antennas. Beamforming to a specific STA to send data under the circumstance where several STAs exist is required, and thus, a channel sounding scheme is needed. IEEE 802.11n supports two types of channel sounding schemes. One is a regular PPDU scheme containing a data field and an MAC header, and the other is a scheme using a null data packet (NDP) with no data field. In case channel sounding is fulfilled using a null data packet, a PPDU frame in which an NDP announcement is set to announce the null data packet should be first transmitted.

The NDP frame does not contain data but a frame structure PLCP header 210 only.

FIG. 2(B) is a concept view illustrating a VHT PPDU format 220.

Referring to FIG. 2(B), IEEE 802.11ac has newly defined VHT PPDU frame 220. IEEE 802.11ac is a standard regarding a WLAN (wireless local area network) supporting very high throughput (VHT) in a frequency range of 6 GH or less. In IEEE 802.11ac, a WLAN throughput of 1 Gbps over a plurality of STAs is supported, and a maximum throughput of at least 500 Mbps is supported over a link for a single STA.

As compared with IEEE 802.11n supporting a channel bandwidth up to 40 MHz, IEEE 802.11ac supports channel bandwidths of 80 MHz and 160 MHz, and a non-contiguous channel bandwidth of 80+80 MHz. In order to support a high throughput of 1 Gbps, relative to IEEE 802.11n supporting up to 450 Mbps, IEEE 802.11ac supports up to 256-QAM unlike IEEE 802.11n supporting up to 64-quadrature amplitude modulation (QAM), and IEEE 802.11ac supports multiple user MIMO (multiple input multiple output) unlike IEEE 802.11n supporting only single user MIMO (SU-MIMO).

Since IEEE 802.11ac supports MU-MIMO, STAs may have one or more antennas and support only downlink MU-MIMO in current IEEE 802.11ac, in which packets are transmitted from an AP (access point) to several STAs. Further, the number of STAs that may simultaneously send packets is maximally 4, and when the maximum number of spatial streams supportable is eight, each STA may use up to four streams.

Physical layer for supporting VHT is supportive of MU-MIMO and orthogonal frequency division multiplexing (OFDM). The VHT physical layer supports contiguous channel bandwidths of 20 MHz, 40 MHz, 80 MHz and 160 MHz and a non-contiguous channel bandwidth of 80+80 MHz. Each subcarrier in the VHT physical layer supports binary phase shift keying (BPSK), quadrature phase shift keying (QPSK), 16-QAM, 64 QAM, and 256-quadrature amplitude modulation (QAM), as well as ½, ⅔, ¾ and ⅚ coding rates through forward error correction (FEC) using low-density parity-check code (LDPC).

In order to transmit packets in the VHT environment, a PSDU (PLCP service data unit) is made, and is added with a PLCP (physical layer convergence procedure) preamble, generating a PPDU (PLCP protocol data unit). The PLCP preamble is used to demodulate and transfer a PSDU at the receive end.

The VHT PPDU format 220 includes an L-STF 222, an L-LTF 224, an L-SIG 226, a VHT-SIG-A 228, a VHT-STF 230, VHT-LTFs 235, a VHT-SIG-B field 237 and a data field 240. While the L-STF 222, the L-LTF 224, and the L-SIG field 226 are fields used in WLAN before supporting VHT, the VHT-SIG-A 228, the VHT-STF 230, VHT-LTFs 235, and VHT-SIG-B field 237 are fields that are present only in VHT packets.

Among the fields newly added to support VHT, the VHT-SIG-A field 228 contains information for explaining VHT format packet and have information commonly required for all STAs. The VHT-SIG-A field 228 consists of a VHT-SIG-A1 field 270 and a VHT-SIG-A2 field 280. The VHT-SIG-A1 field 270 includes the bandwidth 272 of a used channel, whether space time block coding (STBC) is to be used 274, group ID 276 for representing the group to be used for transmission in STAs in grouped MIMO, or the number of streams used 278. On the other hand, the VHT-SIG-A2 field 280 contains short guard interval (SGI) 282, FEC 284, information 286 on the type of channel coding for multiple users or modulation and coding scheme (MCS) for a single user, information 287 on beamforming, redundancy bits 288 for cyclic redundancy checking (CRC), and tail bits 289 of convolutional decoder.

The VHT-STF 230 is a field provided to enhance automatic gain control estimation under the MIMO environment, and the VHT-LTF 235 is a field provided for channel estimation in the MIMO environment. The VHT-SIG-B field 237 is information localized to each STA and contains the length of PSDU and information on MCS and tail bits.

FIG. 2(C) shows VHT-SIG-As 270 and 280 consisting of two symbols and a VHT-SIG-B field 290 consisting of one symbol. Among them, the specific content contained in the VHT-SIG-A1 field 270 is set forth in Draft STANDARD for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz, Ch. 22.3.8.2.3, table 22-11 fields in the VHT-SIG-A field. The specific content contained in the VHT-SIG-B field 290 is set forth in table 22-13.

Hereinafter, according to embodiments of the present invention, PHY (physical) preamble structures for apparatuses operating in sub 1 GHz (or "PLCP header" may also be used as having the same concept) are disclosed. The present invention may apply to apparatuses operating in a sub 1 GHz band as defined in IEEE 802.11ah or 802.11af. However, what is suggested herein is not limited to the M2M systems and may be applicable to general WLAN (wireless local area network) systems (or Wi-Fi networks) without departing from the gist of the present invention.

Sub 1 GHz communication covers a significantly broad area as compared with the existing WLAN systems that are usually used indoors. The frame structure of the physical layer used in sub 1 GHz band may be created by simply ¹⁄₁₀ down clocking the existing frame structure used in IEEE 802.11ac. The frame used in the channel bandwidths of 20/40/80/160/80+80 MHz in IEEE 802.11ac is ¹⁄₁₀ down clocked and may be used in a 2/4/8/16/8+8 MHz channel bandwidth of sub 1 GHz band. As ¹⁄₁₀ down clocked, the guard interval (GI) is increased by 10 times from 0.8 microsec to 8 microsec. In case the frequency band is decreased by ¹⁄₁₀, and a ¹⁄₁₀ down clocked frame is used, data throughput may be reduced by ¹⁄₁₀.

Hereinafter, according to an embodiment of the present invention, for ease of description, an IEEE 802.11ac frame is assumed to be ¹⁄₁₀ down clocked to thus generate a frame. The duration of one OFDM (orthogonal frequency division multiplexing) symbol in the ¹⁄₁₀ down clocked frame may be 40 microsec that is 10 times as large as 4 microsec that is one OFDM symbol duration in the existing, non-¹⁄₁₀ down clocked frame.

However, a method of generating a PLCP preamble as proposed herein may apply to the PLCP preamble of an 802.11ac frame that has been down clocked at other ratio than that of ⅒ down clocking, and embodiments regarding frames down-clocked at other ratio also belong to the scope of the present invention.

In a S1G (sub 1 GHz) frequency band, there are no legacy devices that have been already operating, and thus, a PLCP preamble may be designed without the need of considering backward compatibility.

In order to use existing frames in a S1G band, a frame obtained by ⅒ down-clocking the PPDU (PLC protocol data unit) of an HT-green field format as set forth in IEEE Standard for Information Technology Telecommunications and information exchange between systems Local and metropolitan area networks Specific requirements Part 11: Wireless LAN Medium Access Control (MAC) and Physical Layer (PHY) Specifications (이하, IEEE 802.11) 의 20.3.2 PPDU (PLCP protocol data unit) format may be put to use.

Hereinafter, according to an embodiment of the present invention, for convenience of description, an example of down-clocking HT-green field format is primarily described, but the present invention may also apply to the frame formats described above in connection with FIGS. 1 and 2, and such embodiments also belong to the scope of the present invention.

Figure 3:
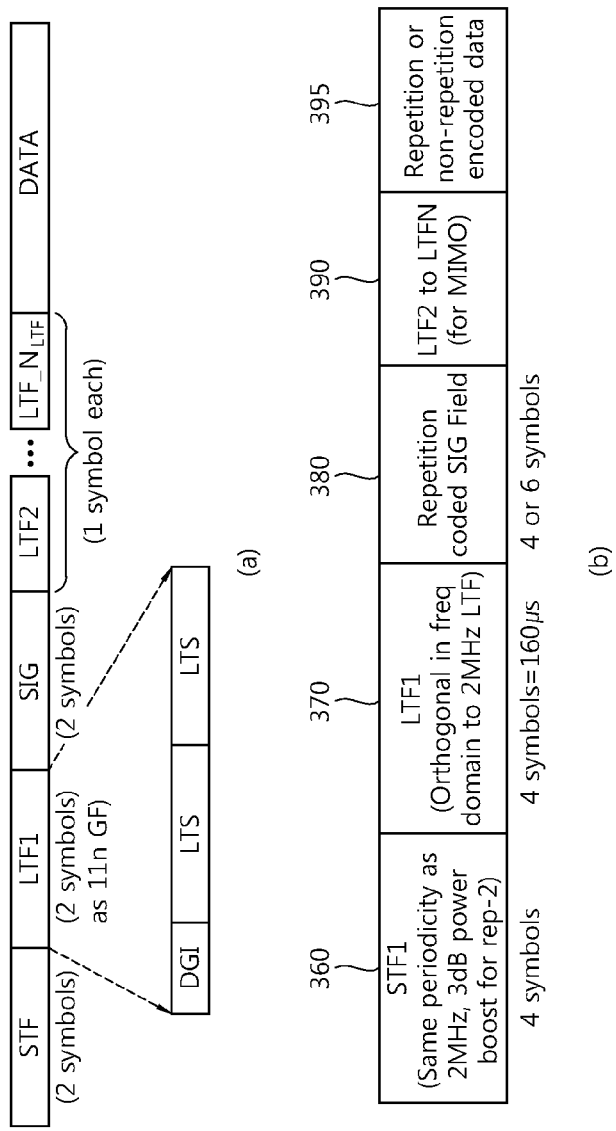
FIG. 3 is a concept view illustrating a frame obtained by 1/10 down-clocking a HT-green field format PPDU.

FIG. 3 is a concept view illustrating a frame obtained by ⅒ down-clocking a HT-green field format PPDU.

Referring to FIG. 3, the ⅒ down-clocked HT-green field format PPDU may include a PLCP preamble 300 and a data payload (or data field 380). The PLCP preamble 300 may include an STF (short training field) 310, an LTF1 (long training field) 320, an SIG 330, and LTF2 to LTF_340. The definition of each field and information contained in each field are set forth in Ch. IEEE 802.11 20.3.9.5, HT-greenfield format preamble. Each field may have the following purposes.

The STF 310 may be used for automatic gain control estimation, timing acquisition, and coarse carrier frequency offset estimation.

The LTF1 320, the LTF2 to LTF_N 340 may be used for channel estimation and fine carrier frequency offset (CFO) estimation. The LTF having two OFDM symbols may contain two LTSs (long term symbols) 350 and 355 and a guard interval 360.

The LTF1 320 may be used to demodulate the data payload (or data field 380) of the PPDU. The LTF2 to LTF_N 340 may be used for channel estimation for each channel transmitting a space-time stream upon using MIMO (multiple input multiple output). In the LTF2 to LTF_N 340, the number of LTFs included in the PLCP preamble may be determined by the number of space-time streams used upon using MIMO.

The SIG 330 may contain information for interpreting HT packet format, such as, e.g., MCS (modulation and coding scheme), channel bandwidth, FEC coding scheme, or other various information for interpreting HT packets.

The STF 310 and the LTF1 320 each may have symbol duration of two OFDM symbols. In case ⅒ ⅒ down-clocking has been conducted, one OFDM symbol has duration of 40 microsec, so that the STF 310 and LTF1 320 coming ahead of the SIG 330 have symbol duration of a total of 160 microsec.

FIG. 3(B) is a concept view illustrating a frame format for performing extended range communication.

FIG. 3(B) assumes an example where a frame of a HT-green field format is transmitted in a frequency bandwidth of 1 MHz.

For example, in case frames are transmitted in 1 MHz, transmission may be conducted with a repetitive frame structure. That is, a frame transmitted when communication is conducted based on broad coverage may be rendered robust against errors by performing repetition on at least one field of the STA 360, LTF 370, SIG field 380 and data field 395 along the frequency axis or time axis.

Referring to FIG. 3(B), two through four OFDM symbols re assigned to the STF 360. In case ⅒ ⅒ down-clock is conducted so that 40 microsec is assigned to one symbol, four symbols are allocated to 160 microsec.

The STF 360 may be transmitted at the same period as when transmission is done in 2 MHz, and repetition structure is used, leading to a 3 dB increase in transmit power.

The OFDM symbols assigned to the LTF 370 may increase from two symbols to four symbols. The LTF may be transmitted orthogonal to the frequency axis with respect to the LTF transmitted in 2 MHz.

The symbols assigned to the SIG field 380 may have a two symbol repetition structure so that the symbols may increase to four symbols or six symbols. In such case, although error robustness of PLCP preamble increases, time consumed for transmitting the PLCP preamble is doubled as compared with the existing frame format. The LTF2 to LTFN 390 and data field 395 may also be transmitted with a repetition structure.

Although WLAN assumes stationary stations (STAs) and stationary Aps, possibility to use in an external environment cannot be excluded. For instance, WLAN may be used in a school campus or outdoor parking lot. In such external environment, channel environments between an AP and a STA may vary. Considering the Doppler Effect that may be existent in real-life, channel may vary in the middle of data transmission, thus resulting in a deterioration of performance.

In order to address such problem, data may be segmented and sent considering the possibility that transmission channel environment would be changed in the middle. However, in case the PLCP preambles such as STF 360, SIG field 380, and LTFs 370 and 390 are all transmitted per data split data field, overhead due to the PLCP preambles should be treated. In a method of transmitting a preamble according to an embodiment of the present invention, channel estimation is conducted in the middle or end of the split data field, so that additional LTFs used for demodulating the data field are transmitted.

The location of the added LTFs 370 and 390 may be directly or indirectly indicated or considering the terminal's operating environment, a predetermined fixed location may be used. Such information is denoted additional LTF indication information.

For example, the additional LTF indication information may be contained in the SIG field 380 and may be used for transmitting information on the location of the LTF.

Hereinafter, according to an embodiment of the present invention, in case a training field is inserted to the data field, a plurality of LTFs may be inserted from the beginning of the data field at a constant period N. N may be represented in milisecs or microsecs or in other unit such as the number of OFDM symbols. N may have a predetermined value. The LTF may be semi-statically transmitted through a management frame without having a predetermined period.

Figure 4:
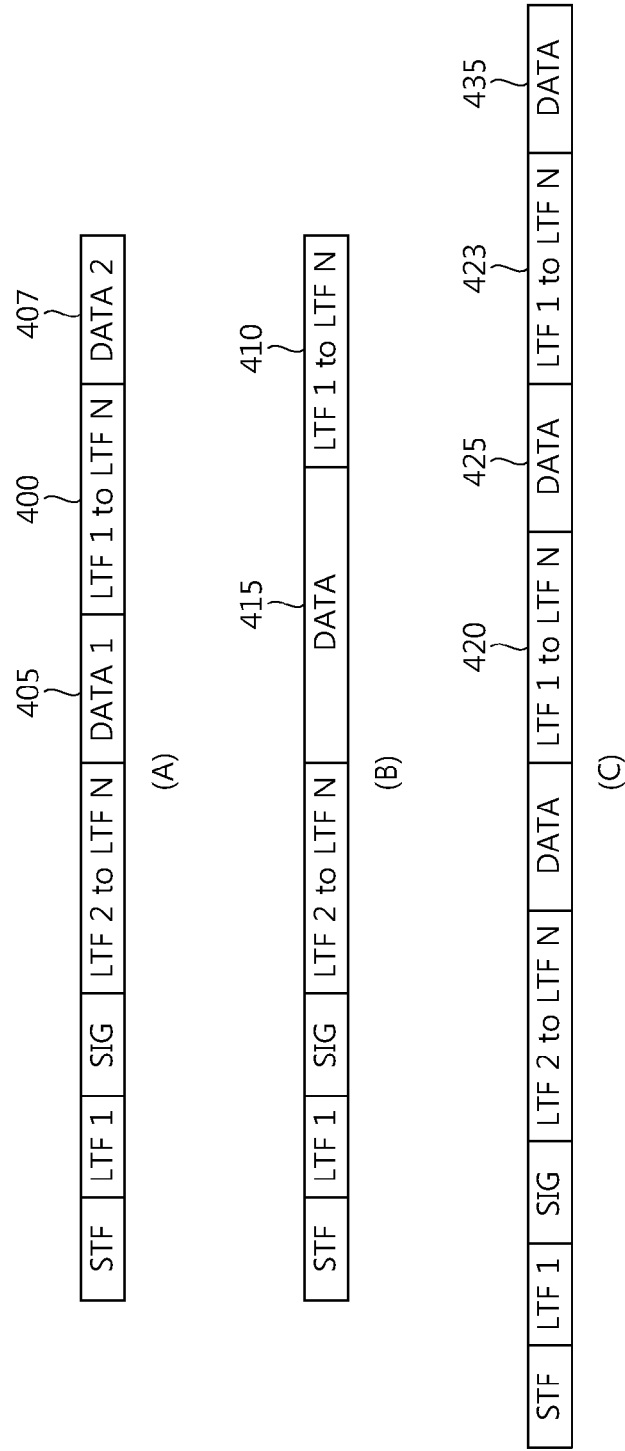
FIG. 4 shows frame formats according to embodiments of the present invention.

FIG. 4 shows frame formats according to embodiments of the present invention.

Referring to FIG. 4(A), the data field may be further split to a plurality of units 405 and 407, and upon transmission, an additional training field 400 is included between the split data fields 405 and 407.

Different schemes of transmitting the training field 400 may apply depending on the MCSs (modulation coding scheme) applying to frames. Upon performing a link adaptation method, in case channel state is good, coding and modulation may be conducted using a high MCS index, and in case channel state is poor, a lower MCS index may be used to perform coding and modulation. In the case of good channel state (when using a high MCS index), without use of an additional training field 400, decoding and demodulation may be done without errors. However, when the channel state is poor (upon using a low MCS index), an additional training field 400 needs to be sent for further performing channel estimation and fine carrier frequency offset (CFO) estimation.

That is, for example, additional training fields (LTFs) 400 are added to the data field 405 and 407 until it has MCS2 (QPSK, ¾ code rate) and are then transmitted. In the case of having an MCS index larger than MCS2, no additional training field 400 may be transmitted. By another method, a field indicating whether additional training fields (LTFs) 400 are added to the data field 405 and 407 until it has MCS2 (QPSK, ¾ code rate) is added and is then transmitted, and in the case of having an MCS index larger than MCS2, no additional training field 400 may be transmitted.

As another example, a scheme may also be possible of indicating whether additional training fields (LTFs) 400 are to be added to the data field 405 and 407 until it has MCS3 (16QAM, ½code rate) or MCS4 (16QAM, ¾ code rate).

By using a scheme of determining whether to send an additional training field with an MCS, it may be possible to reduce overhead that is caused by sending additional training fields 405 and 407 even when channel state is good.

FIGS. 4(B) and 4(C) show additional training fields 410, 420, and 430.

As shown in FIG. 4(B), the training field 410 may follow the end of the data field, or as shown in FIG. 4(C), the additionally transmitted training fields 420 and 430 may be transmitted a specific period interval. If the additionally transmitted training fields have a specific period, the STA may send predetermined channel parameter information produced for a downlink channel, and based on this, the transmitting end may send a training field at a predetermined period.

Information regarding the location of additional training fields (location of additional LTFs) about an interval at which the additional training fields (LTFs) are added to the data field is associated with a Doppler frequency (fd) value that is related to the degree of channel variation. The Doppler frequency (fd) is associated with the velocity (v) of STA. When the velocity of light is c=3×10^8 m/s and the center frequency is fc, the relation shown in Equation 1 as follows is established:

$$f_d = \pm f_c \cdot v/c \qquad \text{<Equation 1>}$$

Referring to Equation 1, for example, when fc=900 MHz, and the travelling velocity of STA satisfies v=3 km/h, fd may be equal to about 3 Hz.

As such, under the environment where OFDM symbol duration is long and long PPDU (PHY protocol data unit) duration is considered as set forth in IEEE 802.11ah, even in the case of a low Doppler frequency value, if channel estimation is conducted relying only on the preamble LTF, performance deterioration may occur due to a channel variation.

Therefore, according to an embodiment of the present invention, channel variation-related parameter information such as Doppler frequency (fd) or STA's mobility information (e.g., velocity) may be transmitted in the STA's association step (scanning, authentication, association) or may be semi-statically sent to the AP. Upon data transmission to the STA, the AP may set an interval between training fields (LTFs) added to the data field based on the parameter information relating to channel variation.

Reversely, such information may be provided from the AP to the STA. When an AP has mobility, i.e., mobile AP, information on the AP's maximum velocity may be provided to the STA. Such AP's mobility information may be utilized as information for adding training fields (LTFs) to the data field at a proper field upon transmission of PPDU (PHY protocol data unit) from the STA to the AP.

Figure 5:
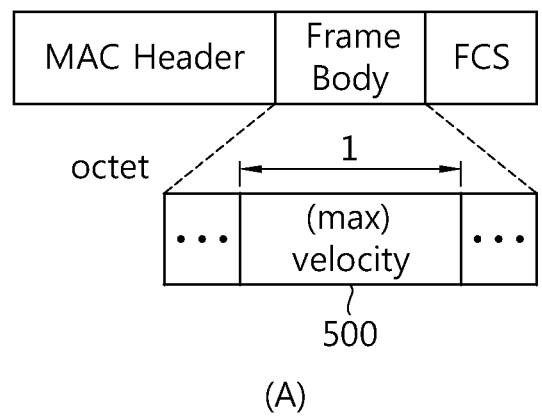
FIG. 5 shows information elements for transmitting channel variation parameters according to an embodiment of the present invention.
Figure 5:
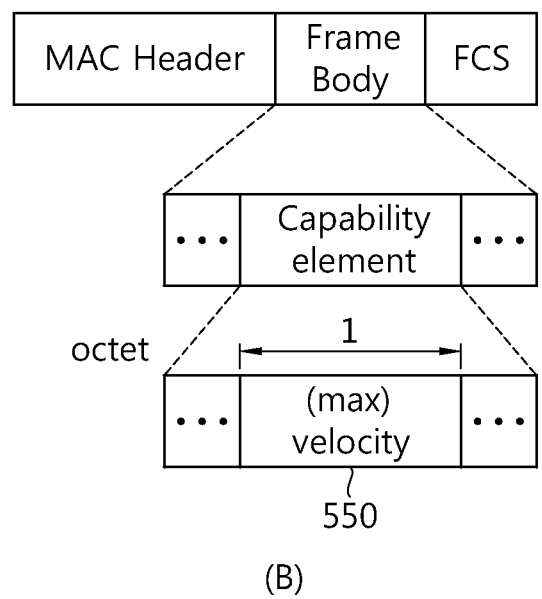

FIG. 5 shows information elements for transmitting channel variation parameters according to an embodiment of the present invention.

Referring to FIG. 5, an information element containing information on the maximum velocity of an STA or AP may be included in a management frame and may be transmitted.

FIG. 5(A) shows a frame format when the maximum velocity information is transmitted as an independent information element.

Information on individual fields contained in the frame format is set forth in Format of management frames, Ch. 8.3.3.1, (IEEE Draft P802.11-REVmb™/D12, November 2011), IEEE Standard for Information Technology—Telecommunications and information exchange between systems—Local and metropolitan area networks—Specific requirements Part 11: Wireless LAN Medium Access Control (MAC) and Physical Layer (PHY) Specifications (hereinafter, "IEEE 802.11 standard document) disclosed on November, 2011.

Information on the AP's maximum velocity (max velocity) 500 may be transmitted, contained in the body of the frame as one information element. The information on the maximum velocity 500 may contain a value that is represented in a specific velocity unit such as m/s.

FIG. 5(B) shows a frame format when maximum velocity information is transmitted contained in another information element.

Referring to FIG. 5(B), the frame body may be transmitted included as one information element among capability elements. For robust communication achieved by informing the STA's maximum velocity value in the form of capability information, additional LTFs may be added to the data field considering the maximum velocity value and may be transmitted.

The frame formats shown in FIGS. 5(A) and 5(B) are merely an example, and the (maximum) velocity may be included in other frame formats as information element 550 and may be transmitted.

Such frame containing the information element relating to the channel variation parameter may be defined as channel variation parameter frame.

The maximum velocities 500 and 550 may be transmitted, included in a management frame exchanged between the STA and the AP until the STA and the AP perform association or may be semi-statically transmitted included in other management frame.

Not only such information element form but also maximum velocity information may be included in a frame as one field and may be transmitted as an independent management frame.

Figure 6:
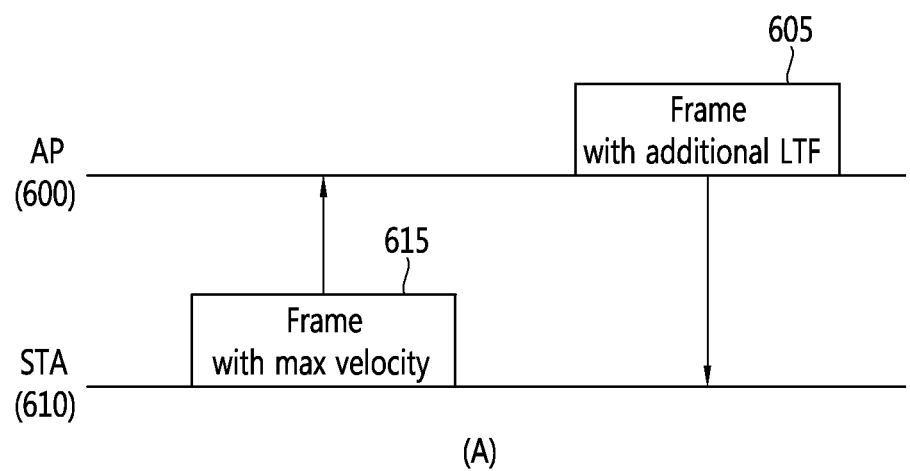
FIG. 6 is a concept view illustrating a method of exchanging maximum velocity information according to an embodiment of the present invention.
Figure 6:
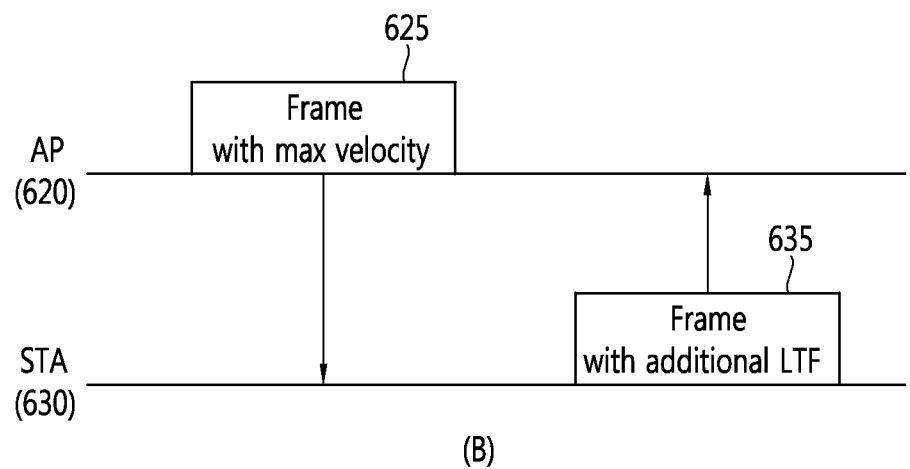

FIG. 6 is a concept view illustrating a method of exchanging maximum velocity information according to an embodiment of the present invention.

Referring to FIG. 6(A), the STA 610 may send, to the AP 600, a channel variation parameter frame 615 including a maximum velocity as an information element.

The channel variation parameter frame 615 may be transmitted in various schemes, such as transmitted together with time information such as a predetermined transmission period (predetermined unit of time) or a predetermined period (e.g., association step), transmitted together with a frame as requested without having a period, or transmitted semi-statically, and such transmission schemes also belong to the scope of the present invention.

The AP 600 may receive the channel variation parameter frame 615 from the STA 610 and based on the maximum velocity information contained in the channel variation parameter frame 615 may yield the period information of a training field to be added to a frame to be transmitted to the STA 610. The AP 600 may generate a frame 605 based on the yielded additional training field period value and may send to the STA 610.

Referring to FIG. 6(B), the AP 600 may also send to the STA 610 a channel variation parameter frame 625 containing a maximum velocity as an information element.

Even when the AP 600 is on the move, the Doppler Effect may be taken into account. The AP 600 may send a channel variation parameter frame 625 containing a maximum velocity information element, and the STA 630 may send to the AP 620 a frame 635 containing an additional training field based on the frame 625.

Figure 7:
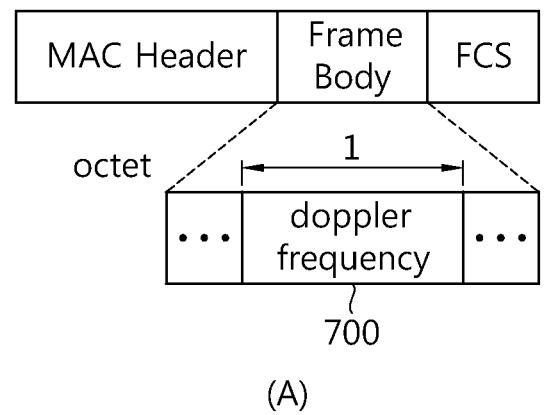
FIG. 7 shows information elements transmitting a channel variation parameter according to an embodiment of the present invention.
Figure 7:
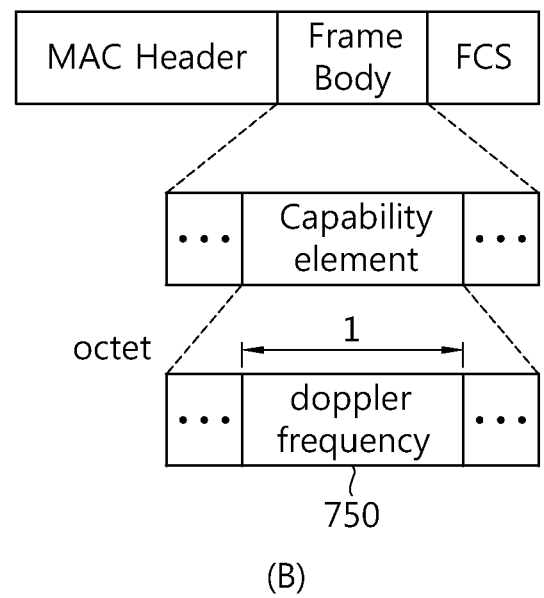

FIG. 7 shows information elements transmitting a channel variation parameter according to an embodiment of the present invention.

Referring to FIG. 7, the STA or AP may contain an information element including information on a Doppler frequency according to move in a management frame and send it.

FIG. 7(A) is a concept view illustrating a frame format when Doppler frequency information 700 is transmitted included as an independent information element.

Information 700 on the Doppler frequency contained in the frame body may be transmitted included in the frame body as one information element. The information 700 on the Doppler frequency may be estimated based on channel information from a receiving STA or may be calculated using Equation 1 above based on its own travelling velocity information.

FIG. 7(B) is a concept view illustrating a frame format when a Doppler frequency is transmitted included in another information element.

Referring to FIG. 7(B), the frame body may be included and transmitted as one information element 750 among capability elements.

The frame formats illustrated in FIGS. 7(A) and 7(B) are merely an example, and the Doppler frequency may be included and transmitted as information element in other format.

The Doppler frequency information may be transmitted not only in the information element form as described above, but also may be included in a frame as one field and transmitted as an independent management frame.

The frame containing an information element relating to a channel variation parameter such as Doppler frequency may be defined as channel variation parameter frame similar to that described above in connection with FIG. 5.

Figure 8:
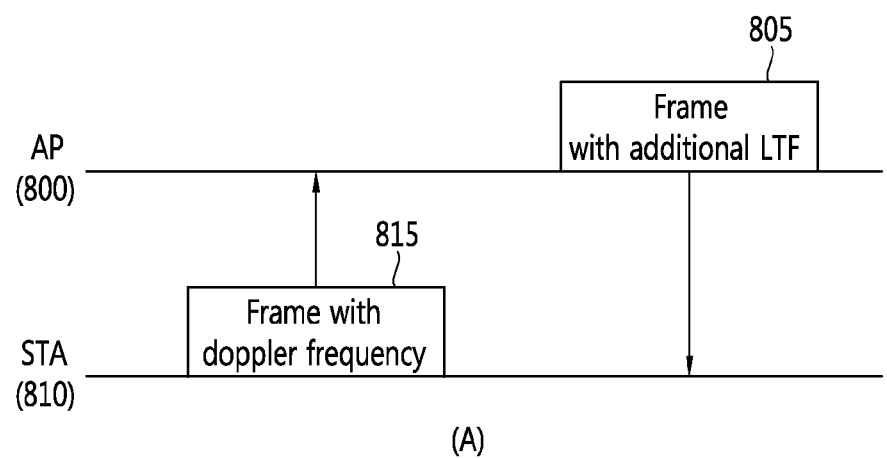
FIG. 8 shows a method of exchanging Doppler frequency information according to an embodiment of the present invention.
Figure 8:
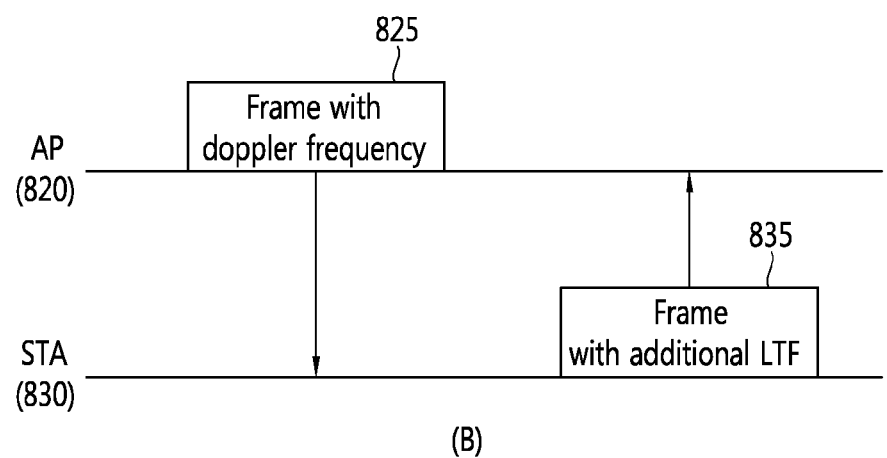

FIG. 8 shows a method of exchanging Doppler frequency information according to an embodiment of the present invention.

Referring to FIG. 8(A), the STA 810 may send to the AP 800 a channel variation parameter frame 815 including a Doppler frequency as an information element.

The channel variation parameter frame may be transmitted in various schemes—for example, the frame may be transmitted with a predetermined transmission period (constant unit of time) or time (for example, association step), transmitted not periodically but as requested or transmitted semi-statically, and such embodiments also belong to the scope of the present invention.

The AP 800 may receive a channel variation parameter frame 815 including Doppler frequency-related information. The AP 800 may produce period information of a training field to be added to the frame 805 to be sent to the STA 810 based on the Doppler frequency information included in the channel variation parameter frame. The AP 800 may generate the frame 805 according to the produced additional training field period and may send to the STA 810.

Referring to FIG. 8(B), the AP 820 may send a channel variation parameter frame 825 including a Doppler frequency as information element to the STA 830.

Even when the AP 820 travels, the Doppler Effect may be taken into account. The AP 820 may send the channel variation parameter frame 825 including a Doppler frequency as information element and the STA 830 may send a frame 835 including an additional training field to the STA 830 based on the frame 825.

FIGS. 5 and 7 disclose a method of transmitting a frame including a maximum velocity or a Doppler frequency to the AP in order to receive a frame considering the Doppler Effect in the STA.

However, instead of such method, a method may be used of directly transmitting information on the location of an additional training field from the STA to the AP. The AP may identify the information on the location of the additional training field that has been transmitted from the STA and may send a response frame to determine whether to send the frame including the additional training field according to the information on the location of the additional training field transmitted from the STA. Further, a response frame may be sent to transmit the frame including the additional training field according to the information on the location of the additional training field sent from the STA.

Figure 9:
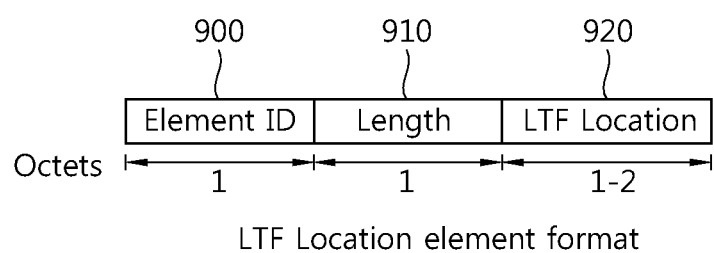
FIG. 9 shows a training field location element format according to an embodiment of the present invention.

FIG. 9 shows a training field location element format according to an embodiment of the present invention.

Referring to FIG. 9, the LTF field location element format may include an element ID 900, a length 910, and an LTF location 920.

The element ID 900 may be used as information for indicating that the current element is an LTF location element.

The length 910 may indicate the number of bits assigned to the LTF location 920.

The LTF location element 920 may be transmitted included in various management frames. For example, an LTF field location element may be included in a probe request frame/probe response frame that are exchanged while the STA and the AP perform an association procedure when the frames are transmitted, or an LTF field location element may be transmitted included in an association request frame/association response frame.

In case the information relating to the LTF location varies, the frame containing the LTF location element 920 is resent so that a frame including an additional LTF present at the newly set location based on the transmitted frame may be transmitted.

The frame format shown in FIG. 9 is an example frame including an LTF location 920 as information element, and a frame including the LTF location 920 as information element may have a different frame format from that shown in FIG. 9, and such embodiment also belongs to the scope of the present invention.

A method of transmitting an independent frame for information on the location of an additional LTF may also be used.

Figure 10:
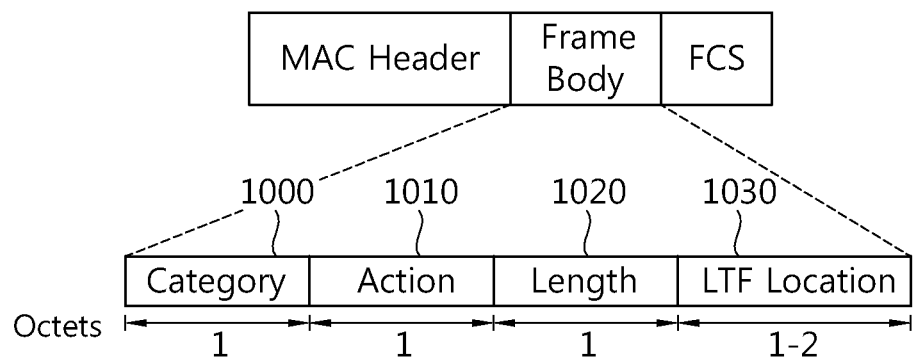
FIG. 10 is a concept view illustrating a channel variation parameter frame according to an embodiment of the present invention.

FIG. 10 is a concept view illustrating a channel variation parameter frame according to an embodiment of the present invention.

FIG. 10 is a concept view illustrating a channel variation parameter frame according to an embodiment of the present invention.

FIG. 10 illustrates a method of transmitting an LTF location as field information through one frame.

Referring to FIG. 10, the channel variation parameter frame may contain a category 1000, an action 1010, a length 1020, and an LTF location 1030.

(1) Category 1000 may contain information on the frame category of the channel variation parameter frame. For instance, the channel variation parameter frame may be included in an action frame.

(2) Action 1010 may be used as an indicator for specifying a channel variation parameter frame among action frames.

(3) Length 1020 may contain length information assigned to the LTF location 1030.

(4) LTF location 1030 may contain information relating to an OFDM symbol through which an additional LTF is transmitted or information on time duration during which an LTF is transmitted.

The frame format shown in FIG. 10 is an example frame of independently transmitting information on the LTF location 1030 and may have other independent frame format for transmitting the LTF location 1030. Such embodiment also belongs to the scope of the present invention.

Figure 11:
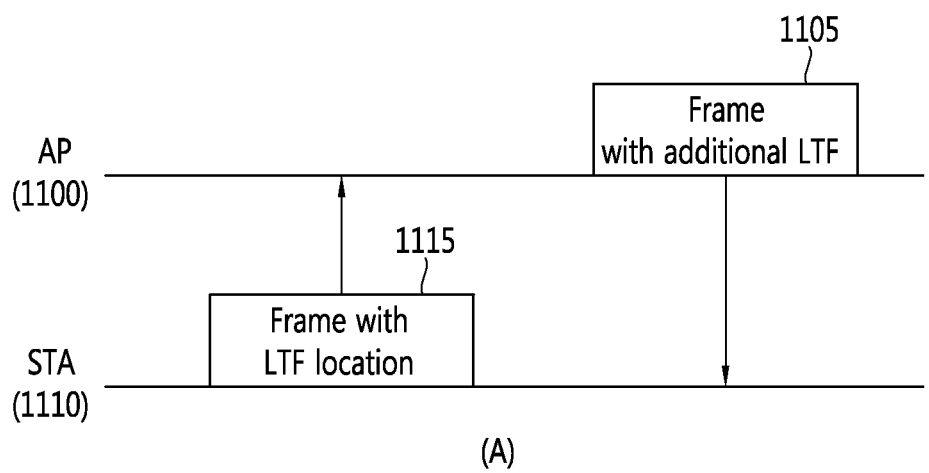
FIG. 11 is a concept view illustrating a method of exchanging LTF location information according to an embodiment of the present invention.
Figure 11:
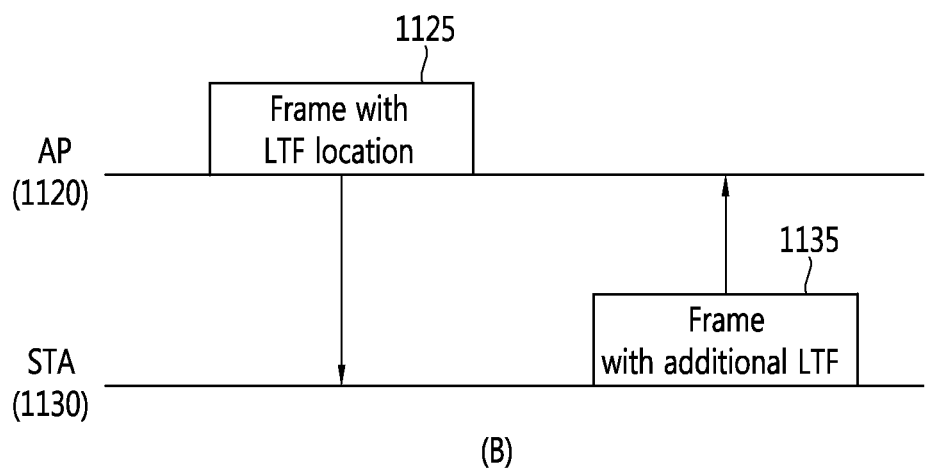

FIG. 11 is a concept view illustrating a method of exchanging LTF location information according to an embodiment of the present invention.

Referring to FIG. 11(A), the STA 1110 may send to the AP 1100 a channel variation parameter frame 1115 containing an LTF location element as information element or a channel variation parameter frame 1115 including information on the LTF location as a field.

Transmission may be performed in various schemes—for example, the frame may be transmitted with a period (constant unit of time) or time (e.g., association step) for transmitting a channel variation parameter frame or as requested with no period, or may be transmitted semi-statically. Such embodiment also belongs to the scope of the present invention.

The AP 1100 may receive the channel variation parameter frame 1115 and based on the LTF location element information contained in the channel variation parameter frame may include an additional LTF in a frame to be transmitted to the STA 1110 upon transmission to the STA 1110.

Referring to FIG. 11(B), the AP 1100 may also send to the STA 1110 a channel variation parameter frame 1125 containing an LTF location element as information element or a channel variation parameter frame 1125 including information on the LTF location as a field. By using such method, even when the AP 1120 is on the move, the Doppler Effect may be considered. The STA 1130 may send a frame 1135 including an additional training field to the AP 1120 based on information relating to the LTF location contained in the channel variation parameter frame 1125 including the information on the LTF location as a field or the channel variation parameter frame 1125 including the LTF location element as information element.

Figure 12:
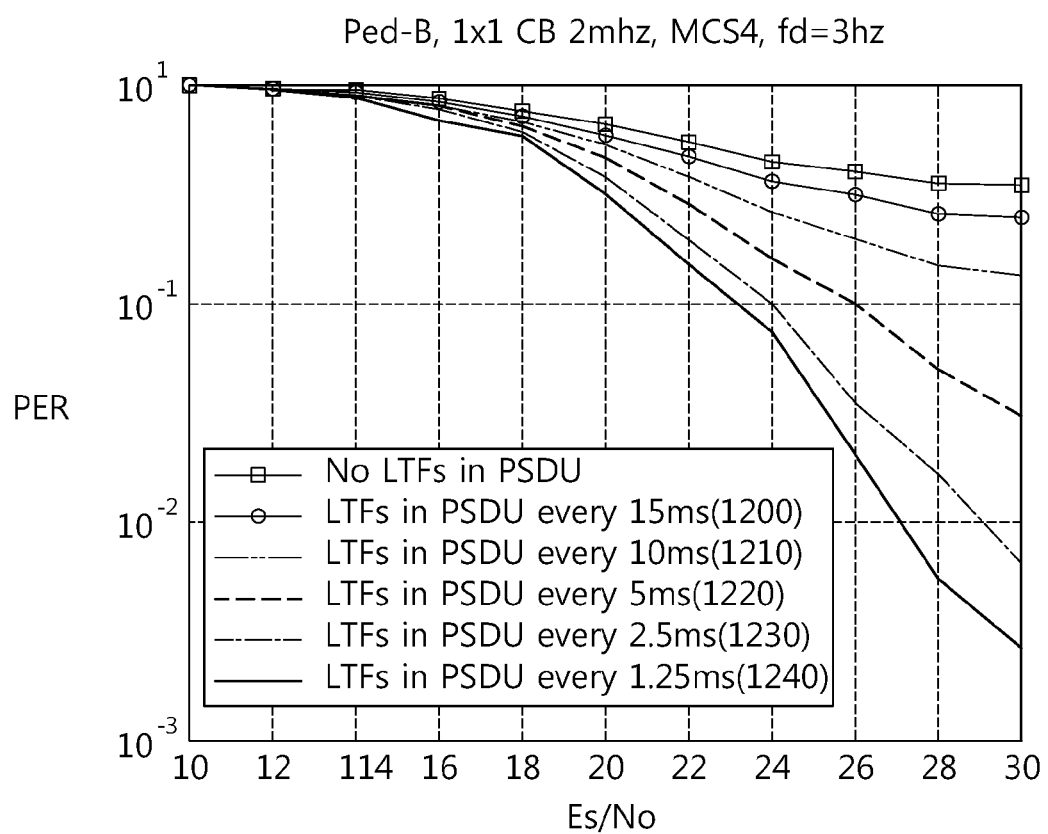
FIG. 12 is a graph illustrating the degree of enhancement in link level performance when transmission is performed using an additional LTF according to an embodiment of the present invention.

FIG. 12 is a graph illustrating the degree of enhancement in link level performance when transmission is performed using an additional LTF according to an embodiment of the present invention.

Channel variation parameter frames including information relating to a channel variation such as velocity information, information relating to a Doppler frequency, or information relating to LTF location may be exchanged between the AP and the STA as described above. According to the information relating to channel variation, the period at which the additional LTF is transmitted and location information of the additional LTF may vary in the frames exchanged between the AP and the STA.

FIG. 12 shows a PER (packet error rate) performance according to a period at which an additional LTF is transmitted in a frame.

Referring to FIG. 12, in the case of single-stream transmission using MCS4 (16QAM, ¾ code rate) based on ITU Ped-B model, in case additional LTFs are added to the data field every t ms (t=15(1200), 10(1210), 5(1220), 2.5(1230), 1.25(1240) [ms]) under the Doppler frequency (fd=3 Hz), it can be seen that PER performance is prominently enhanced.

In accordance with another method of transmitting a channel variation parameter as suggested herein, information relating to a channel delay profile other than the above-described channel variation parameters such as Doppler frequency or velocity may be offered so that upon PPDU (PHY protocol data unit) transmission, the channel delay profile-related information may be utilized in choosing a LGI (long guard interval) or SGI (short guard interval).

Like the above-described channel variation parameter, the channel delay profile-related information also may be transmitted in various transmission schemes—for example, the information may be transmitted with a period (constant unit of time) or time (e.g., association step) of transmitting a channel variation parameter frame, or as requested with no period, or may be transmitted semi-statically. Such embodiment also belongs to the scope of the present invention.

Typically, in relation to information on delay profile, a recipient may estimate a maximum channel delay value by obtaining a channel frequency response through the LTF portion in the preamble and acquiring an estimated delay profile value upon conversion the channel frequency response in the time domain.

However, in case the distance between the transmitter and the receiver is large or channel quality between the transmitter and the receiver is low, such delay profile estimation suffers from low performance, thus causing an inaccurate maximum channel delay value to be estimated. In particular, in the case of the last maximum delay tap, its average power is typically significantly low as compared with other delay taps so that failure of maximum delay tap detection may result in selection of a wrong GI (guard interval).

The present invention discloses a method of estimating a maximum channel delay value by using (1) a method of increasing delay profile estimation performance by transmitting maximum channel delay-related information through an information element or field and (2) a method of further increasing delay profile estimation performance by providing both the maximum channel delay-related information and RMS delay.

The maximum channel delay may mean a total time interval during which a reflection with significant energy arrives, and the RMS (root mean square) delay may mean an RMS value of a reflection delay that has been computed considering a weight in addition to the reflection energy.

Figure 13:
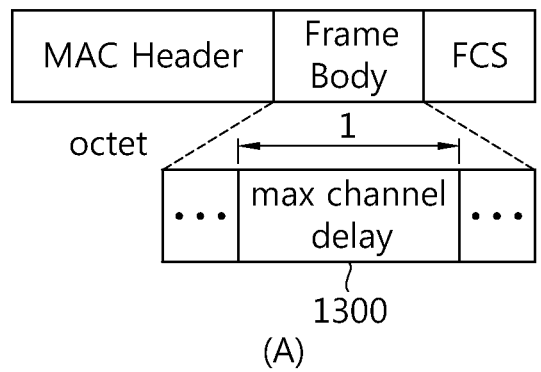
FIG. 13 shows frame formats transmitting channel parameter information according to an embodiment of the present invention.
Figure 13:
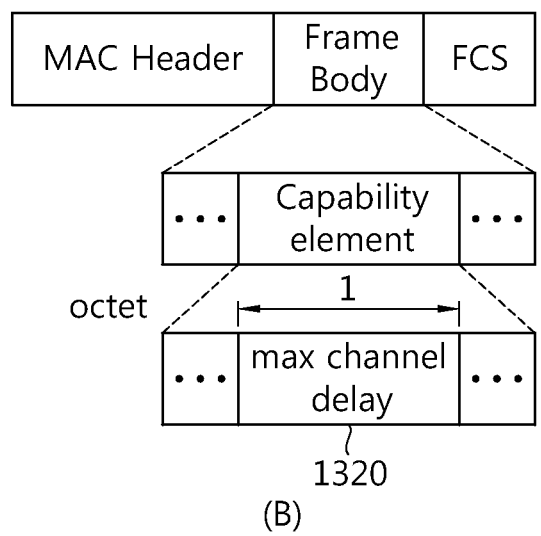
Figure 13:
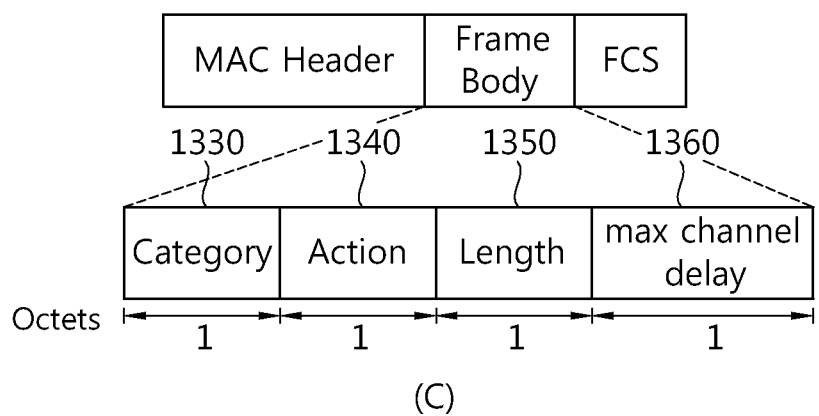

FIG. 13 shows frame formats transmitting channel parameter information according to an embodiment of the present invention.

FIG. 13(A) is a concept view illustrating an example where a maximum channel delay is transmitted included in a management frame as one information element.

FIG. 13(A) is a concept view illustrating a frame format when maximum channel delay information is transmitted included as an independent information element.

Information 1300 on the maximum channel delay included in the frame body may be transmitted included in the frame body as one information element containing channel delay-related information. The STA or AP that transmits a frame based on the information 1300 on the maximum channel delay may determine whether an LGI or SIG is used as a guard interval and may transmit a frame generated based on the determined guard interval.

FIG. 13(B) is a concept view illustrating a frame format when channel delay information is transmitted included in another information element.

Referring to FIG. 13(B), among capability elements, it may be transmitted included as one information element in the frame body. Similarly, the STA or AP that transmits a frame based on the information 1320 on the maximum channel delay may determine whether an LGI or SIG is used as a guard interval and may transmit a frame generated based on the determined guard interval.

The frame formats shown in FIGS. 13(A) and 13(B) are merely an example and the channel delay information may be transmitted included as information element in other format.

FIG. 13(C) is a concept view illustrating a channel variation parameter frame containing maximum channel delay information 1360.

Referring to FIG. 13(C), the channel variation parameter frame may include a category 1330, an action 1340, a length 1350, and a maximum channel delay 1360.

(1) Category 1330 may include frame category information of the channel variation parameter frame. For instance, the channel variation parameter frame may be included in an action frame.

(2) Action 1340 may be used as an indicator for specifying a channel variation parameter frame among action frames.

(3) Length 1350 may contain length information assigned to the maximum channel delay 1360.

(4) Maximum channel delay 1360 is information on a channel delay that may occur to the maximum and may be used as information for determining a guard interval that is to be used by a terminal receiving the maximum channel delay information.

The frame format disclosed in FIG. 13(C) is an example frame that independently transmits a maximum channel delay and may have other independent frame format for transmitting the maximum channel delay 1360. Such embodiment also belongs to the scope of the present invention.

By a method of transmitting channel variation parameter information according to an embodiment of the present invention, RMS delay information as well as maximum channel delay information may be transmitted.

Figure 14:
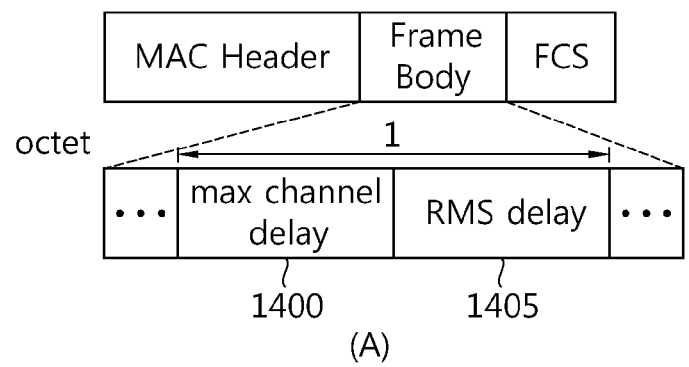
FIG. 14 shows frame formats transmitting channel parameter information according to an embodiment of the present invention.
Figure 14:
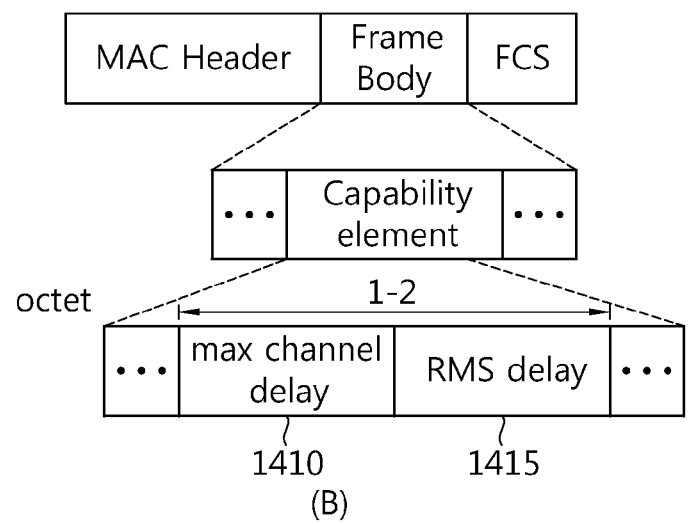
Figure 14:
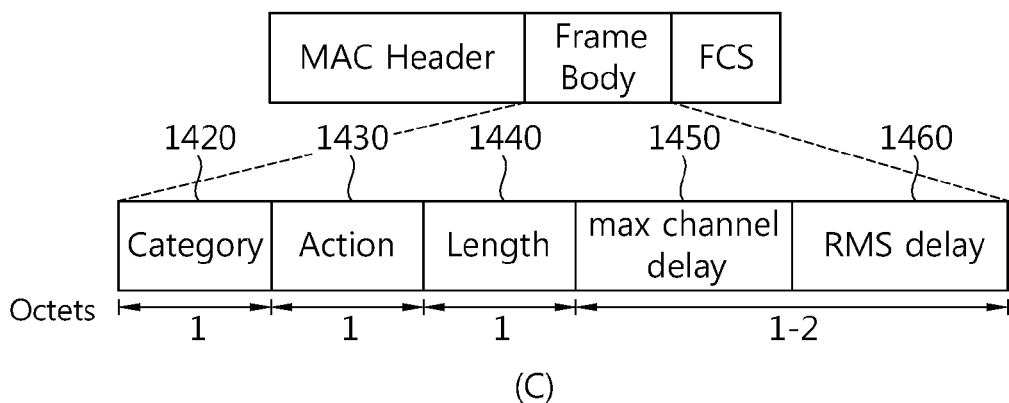

FIG. 14 shows frame formats transmitting channel parameter information according to an embodiment of the present invention.

Although in FIG. 14 the maximum channel delay and the RMS delay are transmitted included in the same information element or the same frame, the maximum channel delay and the RMS delay may also be transmitted included in different information elements or different frames.

FIG. 14(A) is a concept view illustrating an example where the maximum channel delay 1400 and the RMS delay 1405 are transmitted included as one information element in a management frame.

The maximum channel delay information 1400 and the RMS delay 1405 information contained in the frame body may be transmitted as one information element. The STA or AP that transmits a frame based on the maximum channel delay information 1400 and the RMS delay 1405 information may determine whether an LGI or SIG is used as a guard interval and may transmit a frame generated based on the determined guard interval.

FIG. 14(B) is a concept view illustrating a frame format when channel delay information is transmitted included in another information element.

Referring to FIG. 14(B), among capability elements, as one information element, the maximum channel delay information 1410 and RMS delay 1415 information may be transmitted included in the frame body. Similarly, the STA or AP transmitting a frame based on the maximum channel delay information 1410 and RMS delay 1415 information may determine which one of an LGI and an SIG is to be used as a guard interval and may transmit a frame generated based on the determined guard interval. Group ID The frame formats shown in FIGS. 14(A) and 14(B) are merely an example and the maximum channel delay information and the RMS delay information may be transmitted included in a frame of other format.

FIG. 14(C) is a concept view illustrating a channel variation parameter frame including maximum channel delay information.

Referring to FIG. 14(C), the channel variation parameter frame may include a category 1420, an action 1430, a length 1440, a maximum channel delay field 1450, and an RMS delay field 1460.

(1) Category 1420 may contain frame category information of a channel variation parameter frame. For example, the channel variation parameter frame may be included in an action frame.

(2) Action 1430 may be used as an indicator for specifying a channel variation parameter frame among action frames.

(3) Length 1440 may include length information assigned to the maximum channel delay field 1450 and the RMS delay field 1460.

(4) Maximum channel delay 1460 may contain information on a maximum channel delay. The maximum channel delay may be used as information for determining a guard interval to be used by a terminal receiving the maximum channel delay information.

(5) RMS delay field 1460 is information on the RMS delay 1460 and may be used as information for determining a guard interval to be used by a terminal receiving RMS delay information.

The frame format shown in FIG. 14(C) is merely an example frame for transmitting the maximum channel delay 1450 and the RMS delay 1460 and it may have other independent frame format for transmitting the maximum channel delay 1450 and the RMS delay 1460. Such embodiment also belongs to the scope of the present invention.

The frames set forth in FIGS. 13 and 14 may be exchanged between the AP and the STA so that delay-related information may be obtained. When transmitting or receiving delay information (maximum channel delay or RMS delay), the AP or STA may generate an SIG or LGI as a guard interval for a frame based on the delay information and may transmit the same.

Figure 15:
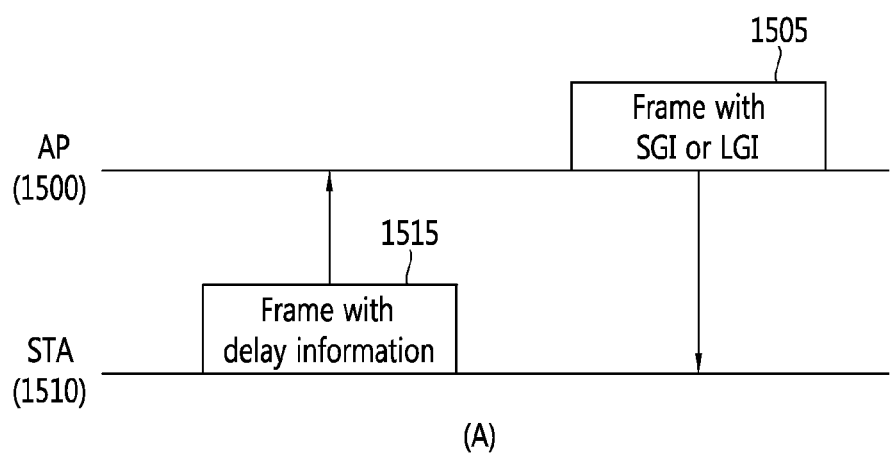
FIG. 15 is a concept view illustrating a method of exchanging delay information according to an embodiment of the present invention.
Figure 15:
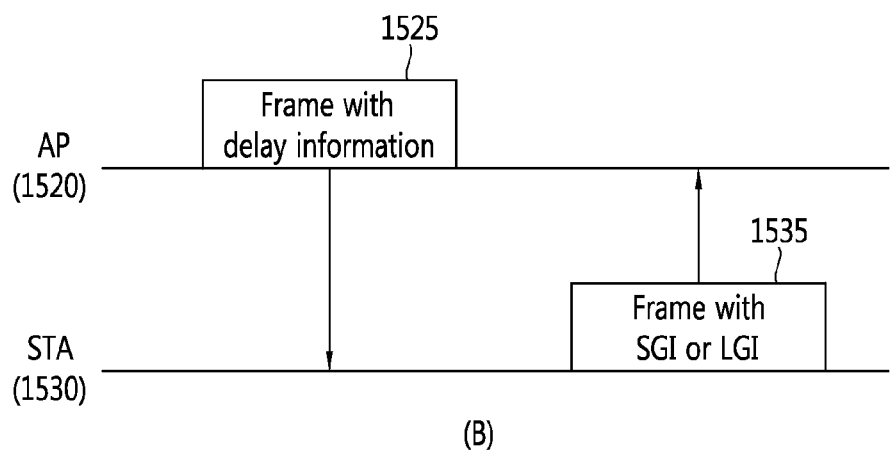

FIG. 15 is a concept view illustrating a method of exchanging delay information according to an embodiment of the present invention.

Referring to FIG. 15(A), the STA 1510 may send to the AP 1500 a channel variation parameter frame 1515 including delay information (maximum channel delay or RMS delay) as an information element or a channel variation parameter frame 1525 including delay information as a field.

The frame may be transmitted with a period (constant unit of time) or time (e.g., association period) during which a channel variation parameter frame is transmitted or as requested with no period or the frame may also be transmitted semi-statically. As such, the frame may be transmitted in various ways, and such embodiment also belongs to the scope of the present invention.

The AP 1500 may receive the channel variation parameter frame 1515 and may determine a guard interval to be set in transmitting a frame to the STA 1510 based on the delay information contained in the channel variation parameter frame. For example, in case the channel delay is determined to be large based on a predetermined threshold, an LGI may be used as CP (cyclic prefix) when transmitting frames, and in case the channel delay is determined to be small based on the predetermined threshold, an SIG may be used as CP (cyclic prefix) upon transmission of a frame.

Referring to FIG. 15(B), the AP 1520 also may transmit to the STA 1530 a channel variation parameter frame 1525 including delay information as an information element or a channel variation parameter frame 1525 including delay information as a field.

By using such method, the AP 1520 may transmit delay information to the STA 1530, and considering the same, the STA 1530 may select the type of a guard interval used for frame transmission and may then send the same.

According to an embodiment of the present invention, the above-described (maximum) velocity, Doppler frequency, LTF location information, delay-related information (maximum channel delay, RMS channel delay) may be combined so that it may be transmitted in the form of one information element or field. Hereinafter, a method is disclosed of combining and transmitting such information.

Figure 16:
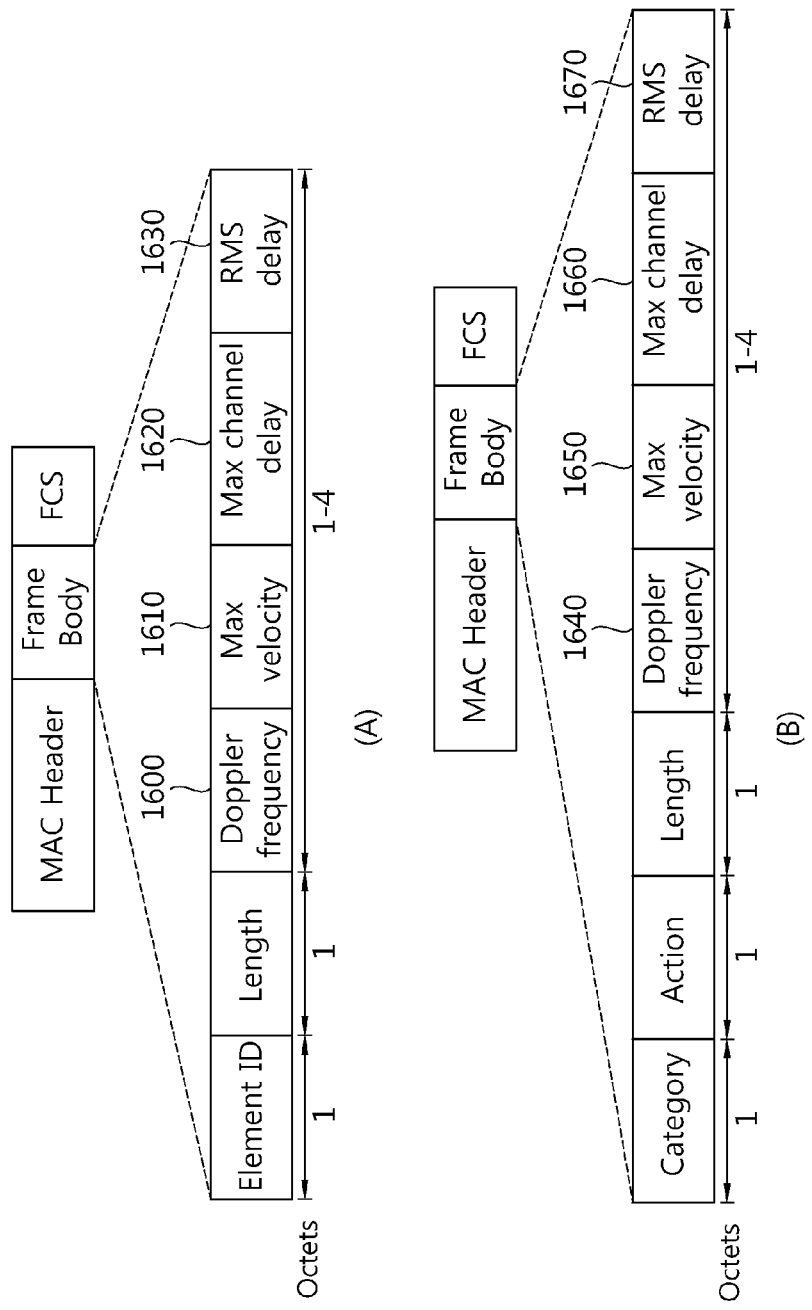
FIG. 16 shows frame formats transmitting channel parameter information according to an embodiment of the present invention.

FIG. 16 shows frame formats transmitting channel parameter information according to an embodiment of the present invention.

Referring to FIG. 16(A), as an information element for transmitting channel parameter information, a channel variation parameter frame including a Doppler frequency 1600, a maximum velocity 1610, a maximum channel delay 1620, and an RMS delay 1630 may be transmitted.

The frame may be transmitted with a period (constant unit of time) or time (e.g., association period) during which a channel variation parameter frame is transmitted or as requested with no period or the frame may also be transmitted semi-statically. As such, the frame may be transmitted in various ways, and such embodiment also belongs to the scope of the present invention.

As shown in FIG. 16(B), a channel variation parameter frame according to an embodiment of the present invention includes as field information a Doppler frequency 1640, a maximum velocity 1650, a maximum channel delay 1660, and an RMS delay 1670, and the channel variation parameter frame may be transmitted.

When the frame including a plurality of channel parameter information is transmitted, as shown in FIG. 16, the type of a guard interval to be used and information on the location where an additional LTF is transmitted may be determined at the same time.

The combination disclosed in FIG. 16 is merely an example, and other various frame formats may be used to transmit channel parameter information. That is, various types of frame formats transmitting delay information used for determining the type of guard interval and additional LTF information to be included in the data field at the frame transmitter side for transmitting various channel parameter information set forth herein may belong to the scope of the present invention.

Figure 17:
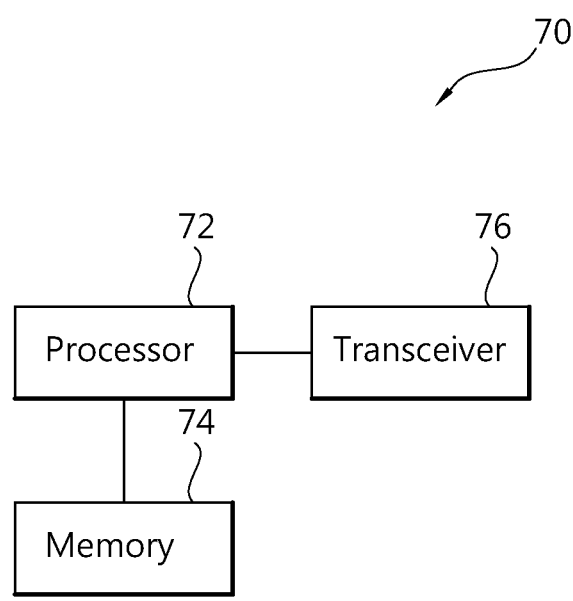
FIG. 17 is a block diagram illustrating a wireless device to which an embodiment of the present invention may apply.

FIG. 17 is a block diagram illustrating a wireless device to which an embodiment of the present invention may apply.

The wireless device 70 is a terminal that may implement the above-described embodiments and may be an AP or a non-AP STA (station). The station may mean either an AP or a non-AP STA (station).

The wireless device 70 includes a processor 72, a memory 72, and a transceiver 76. The transceiver 76 transmits and receives radio signals and implements IEEE 802.11 physical layer. The processor 72 is operatively connected with the transceiver 76 and implements IEEE 802.11 MAC layer and physical layer. The processor 72 may implement a training field transmitting method in a WLAN system according to the embodiments described above in connection with FIGS. 4 to 16. For example, the processor may be configured to transmit additional LTF (long training field) indication information and to transmit a frame including an additional LTF and split data field. That is, the processor 72 may be configured to practice the embodiments set forth herein.

The processor 72 and/or transceiver 76 may include an ASIC (application-specific integrated circuit), other chipset, a logic circuit, and/or a data processing device. The memory 74 may contain an ROM (read-only memory), an RAM (random access memory), a flash memory, a memory card, a storage medium, and/or other storing device. When an embodiment is implemented in software, the above-described schemes may be realized in modules (processes or functions) performing the above-described operations. The modules may be stored in the memory 74 and may be executed by the processor 72. The memory 74 may be positioned in or outside the processor 72 and may be connected with the processor 72 via various known means.

What is claimed is:

1. A method of transmitting a frame according to a channel environment, the method comprising:

receiving, by an access point(AP), long training field (LFT) configuration information from a station, wherein the LTF configuration information includes information related to a maximum velocity of the station, a Doppler frequency due to a moving of the station and an additional LTF;

receiving, by the AP, channel delay information for determining guard intervals to be used upon a transmission of a frame from the station;

determining, by the AP, a period of an additional LTF and a location of the additional LTF based on the LTF configuration information;

determining, by the AP, the guard interval based on the channel delay information, wherein if a value of a channel delay is larger than a predetermined threshold, the guard interval is determined to be a long guard interval (LGI), wherein if the value of the channel delay is smaller or equal to the predetermined threshold, the guard interval is determined to be a short guard interval (SGI);

generating, by the AP, the frame including an LTF, a first split data field, the additional LTF and a second split data field based on the LTF configuration information and the channel delay information; and transmitting, by the AP, the frame to the station by using the determined guard interval, wherein the LTF is located ahead of the first split data field, and wherein the additional LTF is located between the first split data field and the second split data field.

2. The method of claim 1, wherein the channel delay information includes information related to a maximum channel delay and a root mean square (RMS) channel delay.

3. The method of claim 2, wherein the frame further includes information related to the period of the additional LTF and the location of the additional LTF.

4. An access point (AP) transmitting a frame according to a channel environment, the AP comprising:

a radio frequency (RF) unit configured to transmit or receive a radio signal;

a processor operatively connected to the RF unit and configured to:

receive long training field (LFT) configuration information from a station, wherein the LTF configuration information includes information related to a maximum velocity of the station, a Doppler frequency due to a moving of the station and an additional LTF, receive channel delay information for determining a guard interval to be used upon a transmission of a frame from the station, determine a period of an additional LTF and a location of the additional LTF based on the LTF configuration information, determine the guard interval based on the channel delay information, wherein if a value of a channel delay is larger than a predetermined threshold, the guard interval is determined to be a long guard interval (LGI), wherein if the value of the channel delay is smaller or equal to the predetermined threshold, the guard interval is determined to be a short guard interval (SGI);

generate the frame including an LTF, a first split data field, the additional LTF and a second split data field based on the LTF configuration information and the channel delay information, and transmit the frame to the station by using the determined guard interval, wherein the LTF is located ahead of the first split data field, and wherein the additional LTF is located between the first split data field and the second split data field.

5. The AP of claim 4, wherein the channel delay information includes information related to a maximum channel delay information and a root mean square (RMS) channel delay.

6. The AP of claim 5, wherein the frame further includes information related to the period of the additional LTF and the location of the additional LTF.

* * * * *